United States Patent
Iwata

[19]

[11] Patent Number: 5,975,271
[45] Date of Patent: Nov. 2, 1999

[54] SPLINE HUB FOR DAMPER DISK ASSEMBLY

[75] Inventor: Hiroyuki Iwata, Takatsuki, Japan

[73] Assignee: Exedy Corporation, Osaka, Japan

[21] Appl. No.: 09/151,814

[22] Filed: Sep. 14, 1998

[30] Foreign Application Priority Data

Sep. 19, 1997 [JP] Japan .................................. 9-255555

[51] Int. Cl.⁶ .............................. F16D 13/68; F16D 1/00
[52] U.S. Cl. ........................ 192/200; 192/70.2; 403/359
[58] Field of Search .................................. 192/115, 200, 192/207, 212, 70.12; 403/359

[56] References Cited

U.S. PATENT DOCUMENTS

4,836,350  6/1989  Kübel et al. .............................. 192/212

Primary Examiner—Richard M. Lorence
Attorney, Agent, or Firm—Shinjyu Global IP Counselors, LLP

[57] ABSTRACT

A spline hub 1 is a component of a clutch disk assembly 30, which transmits torque between a flywheel 31 and an input shaft 32 of a transmission. The spline hub 1 is produced without being plated, while maintaining the resistance to wear and the accuracy of the dimension of the spline hub 1. The spline hub 1 includes a flange portion 3 and a boss portion 2. The flange portion 3 is coupled to a plate 7 of the clutch disk assembly 30, through which torque is transmitted from the flywheel 31. The boss portion 2 is fixedly coupled to the inner peripheral end of the flange portion 3. Spline grooves 20 are formed on the inner peripheral surface of the boss portion 2. The boss portion 2 is spline-engaged with an input shaft 32 of the transmission. Hardened layers 20a are partially formed on the surface of the spline grooves 20. In one embodiment, the bore of the spline hub 1 has ring-shaped hardened layers 20a intersecting the spline grooves 20. The ring-shaped hardened layers 20a are axially separated from each other. In another embodiment only selected spots of the spline grooves 20 have hardened layers 20b.

25 Claims, 7 Drawing Sheets

SPLINE HUB FOR DAMPER DISK ASSEMBLY

BACKGROUND OF THE INVENTION

1. Field of the Invention

This invention generally relates to a spline hub of a damper disk assembly. More specifically, the present invention relates to a spline hub of a damper disk assembly that is used in a clutch disk assembly.

2. Background Information

A clutch disk assembly transmits and cuts off torque between an engine and a transmission. The clutch disk assembly is one of the members that is rotatably mounted on the input shaft of the transmission. The clutch disk assembly includes a spline hub that engages the input shaft of the transmission. Many spline hubs are either hard chrome plated or Kanigen plated to improve the resistance to wear caused due to the clutch operation.

When plated metal peels due to the continuous clutch operation, the spline engagement portion starts to wear rapidly and does not last long. Moreover, waste water processing facilities are needed to prevent environmental pollution of waste water from plating. Since the plating membrane is very thin (normally thinner than 8 $\mu$m), once the plating membrane wears out, the abrasion proceeds very fast.

Another method of strengthening the spline hub is to heat treat the spline hub and therefore form a hardened layer which is equivalent to the plating layer in the previous method. However, the tooth form of the spline hub generally requires precise measuring to prevent backlashes. Since conventional heat treatment generally causes dimensional change due to deformation from heat, a heat-treated spline hub cannot meet the accuracy requirement of dimension. If a polishing process is added after the heat treatment, the accuracy requirement will be met, but it adds to the number of processes and the cost, which makes the heat treatment a less preferable option than plating.

In view of the above, there exists a need for a spline hub of a damper disk assembly that is especially useful in a clutch disk assembly which overcomes the above mentioned problems in the prior art. This invention addresses this need in the prior art as well as other needs, which will become apparent to those skilled in the art from this disclosure.

SUMMARY OF THE INVENTION

One object of the present invention is provide to a spline hub of a damper disk assembly that does not use plating, while maintaining the resistance to wear and the accuracy of the dimension of the spline hub.

A spline hub according to one aspect of the present invention is used in a damper disk assembly, which transmits torque between an input rotational body and an output rotational body. The spline hub basically includes a flange portion and a boss portion. The flange portion is coupled to an input member of the damper disk assembly. Torque is applied to the input member of the damper disk from the input rotational body. The boss portion is fixedly coupled to the inner peripheral end of the flange portion. The inner peripheral surface of the boss portion includes spline grooves. The boss portion is spline-engaged with an axis of the output rotational body. A hardened layer is partially formed on the surface of the spline grooves on the inner peripheral surface of the boss portion.

The hardened layer is partially formed, only to the extent that is necessary to maintain the required resistance to wear. If the hardened layer is formed on the whole area of the inner peripheral surface, the accuracy requirement of the dimension of the spline hub will not be met due to deformation from the hardening. As a result, the resistance to wear and the accuracy of the dimension of the spline hub are maintained simultaneously. In other words, the hardened layer is only partially formed on the splines, which results in the deformation due to the hardening as being small enough not to effect the accuracy of the dimension of the spline hub. This way, it is possible to eliminate plating, which has been applied to conventional spline hubs while still maintaining the resistance to wear and the accuracy of the dimension.

According to another aspect of the present invention, the surface of the spline hub includes hardened layers on at least two locations that are axially separated from each other. The hardened layers located on at least two spaced locations are designed to prevent wear from occurring due to slipping of the boss portion of the spline hub with the axis of the output rotational body in the axial direction. Moreover, the hardened layers are designed to prevent or reduce wear from incessant contacts of the boss portion of the spline hub with the axis of the output rotational body that takes place when the boss portion of the spline hub and the axis of the output rotational body weld with pressure in rotating direction. In other words, the locations of the hardened layers should not to be concentrated in one portion of the spline groove. By spreading the locations of the hardened layers, wear can also be more evenly spread out over the spline grooves. As a result, the spline grooves as a whole can be more resistant to wear.

According to another aspect of the present invention, the hardened layer of the spline hub is formed on about 10% to about 50% of the area of the surface of the spline grooves. According to this aspect of the present invention, forming the hardened layer on more than 10% of the surface of the spline hub is to assure enough resistance to wear. By limiting the area of the hardened layer to less than 50% the accuracy of the dimension is maintained.

Furthermore, if it is possible to control the ratio of the formation of the hardened layer on the surface of spline grooves. It is also preferable to form the hardened layer on about 20% to about 40% of the surface of the spline groove, from the point of view of the resistance to wear and the accuracy of dimension.

According to another aspect of the present invention, the hardened layer of the spline hub is formed by high-frequency hardening. According to this aspect of the present invention, the high-frequency hardening includes letting the surface of the spline hub heat up internally and quenching rapidly by spraying coolant. Since high-frequency heating can be partially applied to the surface of the spline hub, it is possible to prevent deformation from hardening in the areas where hardened layer is not formed.

According to another aspect of the present invention, the hardened layer of the spline hub is continuous in the circumferential direction. According to this aspect of the present invention, by placing a high-frequency heating device adjacent to a predetermined position on the spline hub and then rotating the spline hub, a hardened layer is formed uniformly on the spline hub in the circumferential direction. This method also reduces the number of times to move the high-frequency heating device, which improves the efficiency of the heating process.

According to another aspect of the present invention, the spline hub is made of either alloy steel or carbon steel which contains carbon more than about 0.35%. The frequency of the high-frequency hardening is preferably more than 400 kHz. The depth of the hardened layer at the bottom of the spline groove is less than approximately 600 μm.

The reason why the depth of the hardened layer at the bottom of the spline groove is less than 600 μm is that if the depth of the hardened layer at the bottom of the spline groove exceeds 600 μm, deformation from heat will be so great that the accuracy of the dimension of the spline hub cannot be secured. The frequency of the high-frequency hardening is to be kept above 400 kHz for the same reason.

According to another aspect of the present invention, the difference between the diameter of the top and the bottom of the spline groove after the hardened layer is formed and the diameter of the top and the bottom of the spline groove before the hardening is less than about 0.2%. If the whole surface of the spline groove is hardened with all the other conditions being the same, the difference tends to be more than about 0.25%, the average being about 0.3%.

According to another aspect of the present invention, the hardened layer of the spline hub is formed by laser hardening. In this aspect of the present invention, the hardened layer of the spline hub is formed by heating the surface of the spline groove with a laser beam and letting the surface of the spline groove self-quench. In other words, the hardened layer can be formed by a dry process. Since laser light can be spotted at any place to form the hardened layer, it is possible to choose positions to form the hardened layer such that the resistance to wear of the spline grooves as a whole will be improved.

According to another aspect of the present invention, the depth of the hardened layer of the spline hub at the bottom of the spline groove is greater than about 3 μm.

According to another aspect of the present invention, the hardened layer of the spline hub is formed mainly on the first side of the teeth. The first side of the teeth is one of the sides between the bottom and the top of the spline groove, and the side that transmits positive rotational torque. According to this aspect of the present invention, the hardened layer of the spline hub is formed mainly on the first side of the teeth by capitalizing on laser being able to choose a small spot to form hardened layer. Since the first side of the teeth normally transmits positive rotational torque, the first side is exposed to incessant contacts under severe loads from fluctuation of torque. Therefore, the first side of the teeth is the side, which wears the most among the surfaces of the spline grooves. By concentrating the hardened layer on the first side of the teeth, the resistance to wear can be improved the most with the smallest area of hardening.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
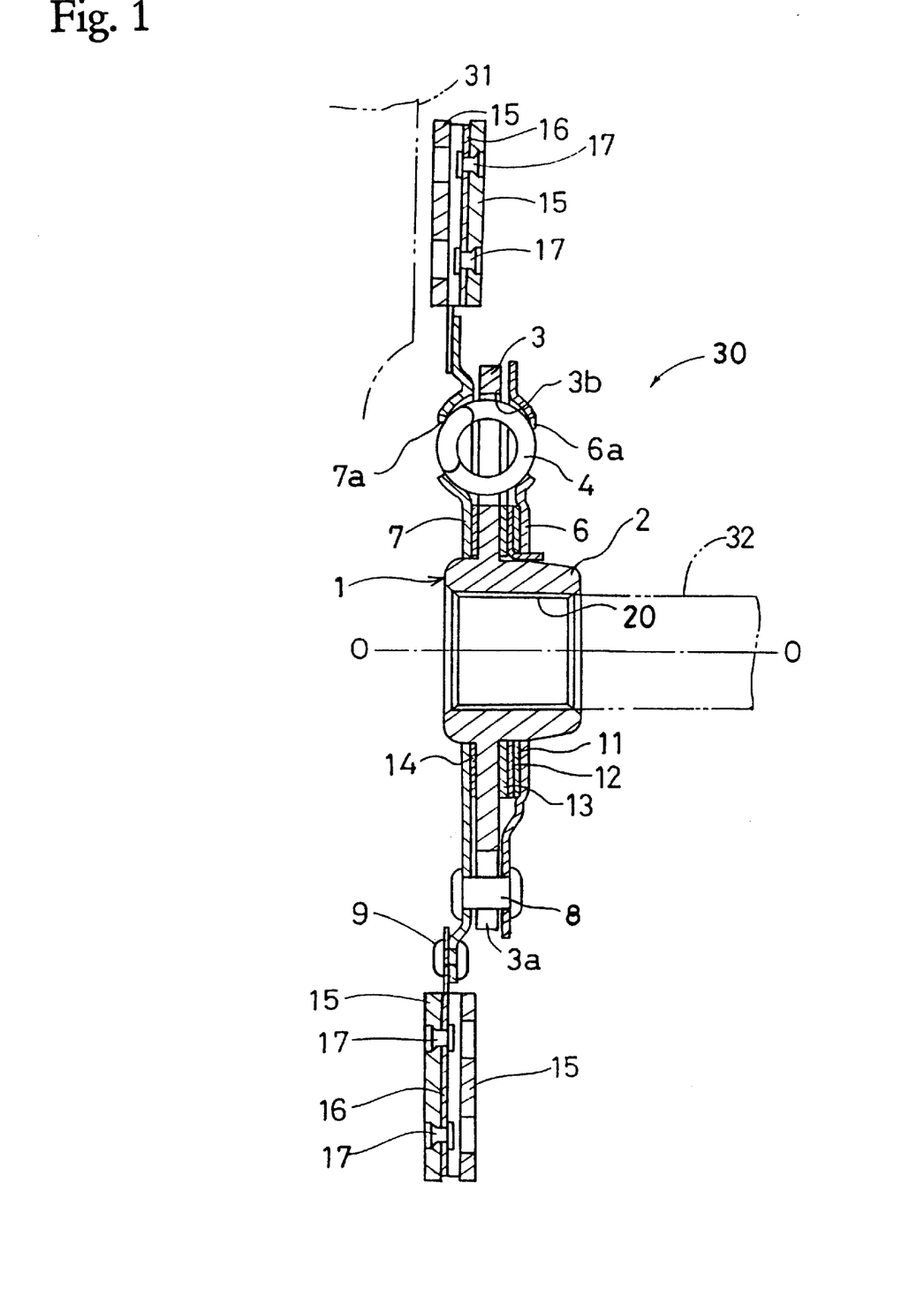
FIG. 1 is a longitudinal cross-sectional view of a clutch disk assembly including a spline hub in accordance with one embodiment of the present invention.

Referring initially to FIG. 1, a clutch disk assembly (damper disk assembly) 30 is illustrated, which includes a spline hub 1 constructed in accordance with one of the embodiments of the present invention. The clutch disk assembly 30 is especially designed to be used in a clutch for cars. The clutch disk assembly 30 transmits torque from a flywheel 31 attached to a crankshaft of an engine (input rotational body) to an input shaft 32 of a transmission (output rotational body). In the FIG. 1, centerline O—O represents the rotational axis of the clutch disk assembly 30.

Figure 2:
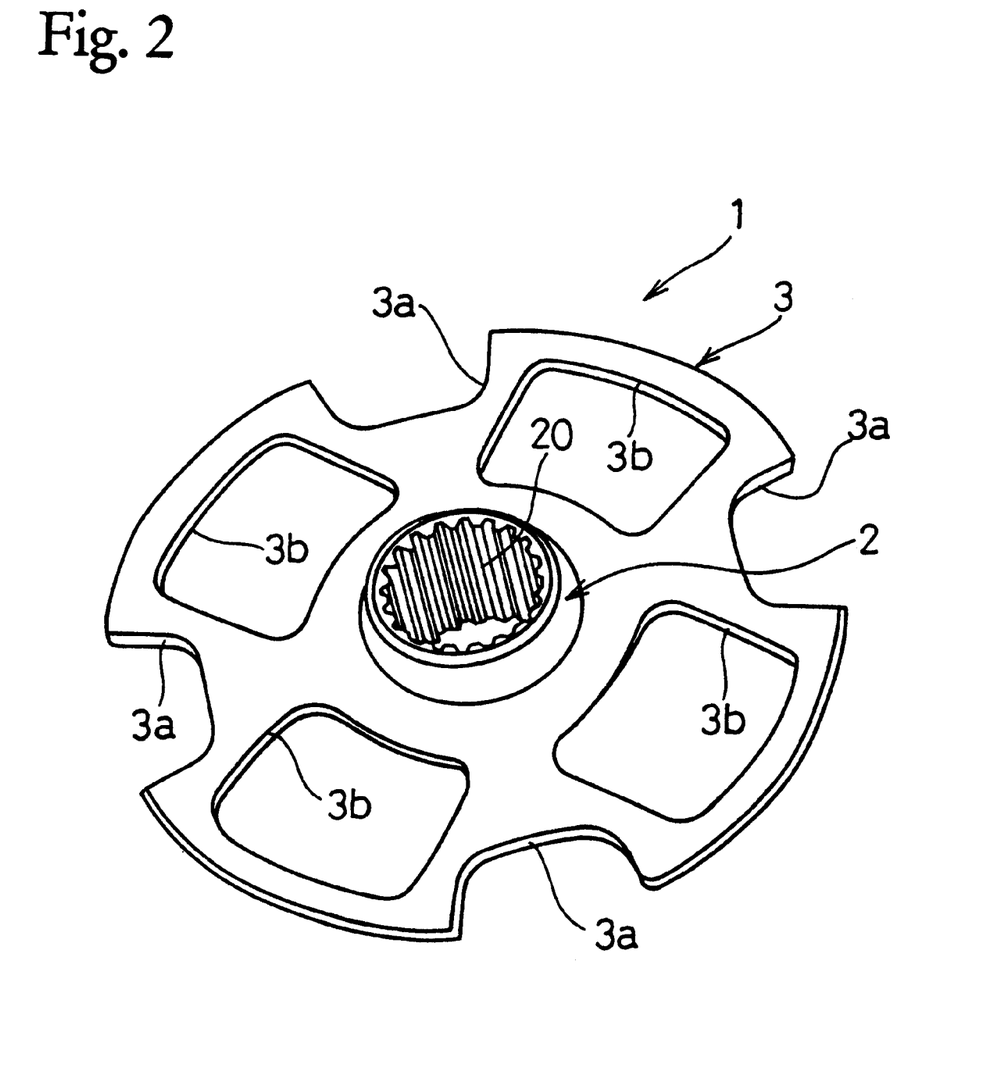
FIG. 2 is a cross-sectional view of a spline hub of the clutch disk assembly.

At the center of the clutch disk assembly 30 is disposed the spline hub 1, which spline-engages with the input shaft 32 of the transmission. The spline hub 1 basically includes a boss portion 2 and a flange portion 3. The boss portion 2 is approximately a disk-shaped member. The boss portion 2 basically includes a center bore with a plurality of spline grooves 20 formed along the inner peripheral surface as seen in FIG. 2. The spline grooves 20 extend axially along the inner peripheral surface of the center bore. The spline grooves 20 engage the spline grooves formed on the outer peripheral surface of the input shaft 32. The spline grooves are partially hardened by high-frequency hardening with induction heating, which will be described later.

The flange portion 3 is a portion that projects radially outwardly from the outer peripheral surface of the boss portion 2. The flange portion 3 is preferably formed as an integral, unitary part of the boss portion 2. In other words, the boss portion 2 and the flange portion 3 are integrally formed as a one-piece unitary member. As is shown in the FIG. 2, the flange portion 3 has a plurality of notches 3a, which are equally spaced about the outer peripheral portion of the flange portion 3. The notches 3a act as stop pins in the outer peripheral portion of the flange portion 3. A window bore or opening 3b is formed in the flange portion 3 in between two adjacent notches 3a. Each of the window bores 3b contains a torsion spring 4 as seen in FIG. 1.

As seen in FIG. 1, a disk-shaped retaining plate 6 and a clutch plate 7 are disposed on the outer peripheral sides of the spline hub 1. Both plates 6 and 7 (input members) are rotatably engaged with the spline hub 1 for rotation relative to each other. The retaining plate 6 and the clutch plate 7 are coupled together at their outer peripheral portions by a plurality of stop pins 8. The stop pins 8 are disposed inside the notches 3a of the flange portion 3.

The clutch plate 7 has a plurality of cushioning plates 16 coupled thereto. In particular, the cushioning plates 16 are fixedly coupled on the outer peripheral portion of the clutch plate 7. Each of the outer cushioning plates 16 has a pair of friction facings 15, with one of the friction facings 15 disposed on each of the sides of the cushioning plates 16. The friction facings 15 are preferably fixedly attached to the cushioning plates 16 by a plurality of rivets 17.

The retaining plate 6 includes a plurality of window bores 6a corresponding to the window bores 3b of the flange portion 3. Likewise, the clutch plate 7 includes a plurality of windows 7a corresponding to the window bores 3b of the flange portion 3. The window bores 6a and 7a are formed such that the torsion springs 4 are covered from the outside and the window bores 6a and 7a contain the torsion springs 4 therebetween.

In between the inner peripheral portion of the flange 3 and the inner peripheral portion of the retaining plate 6 are disposed an annular cone spring 11, a friction plate 12 and a friction washer 13. These components are disposed in this order from the transmission side. Another friction washer 14 is disposed in between the flange portion 3 and the inner peripheral of the clutch plate 7. A predetermined frictional power is generated with the friction washers 13 and 14 sliding with the flange portion 3 in between two plates 6 and 7.

The following is an explanation of the operation of a clutch using the present invention. A pressure plate, which is not shown, pushes the friction facings 15 against a flywheel 31. When the friction facings 15 are coupled by pressure with the flywheel 31, torque can now be transmitted from the flywheel 31 through the friction facings 15 to the cushioning plate 16. The torque is further transmitted to the flange portion 3 via the clutch plate 7, the retaining plate 6, and the torsion spring 4. The torque is output to the input shaft 32 via the boss portion 2.

Figure 3:
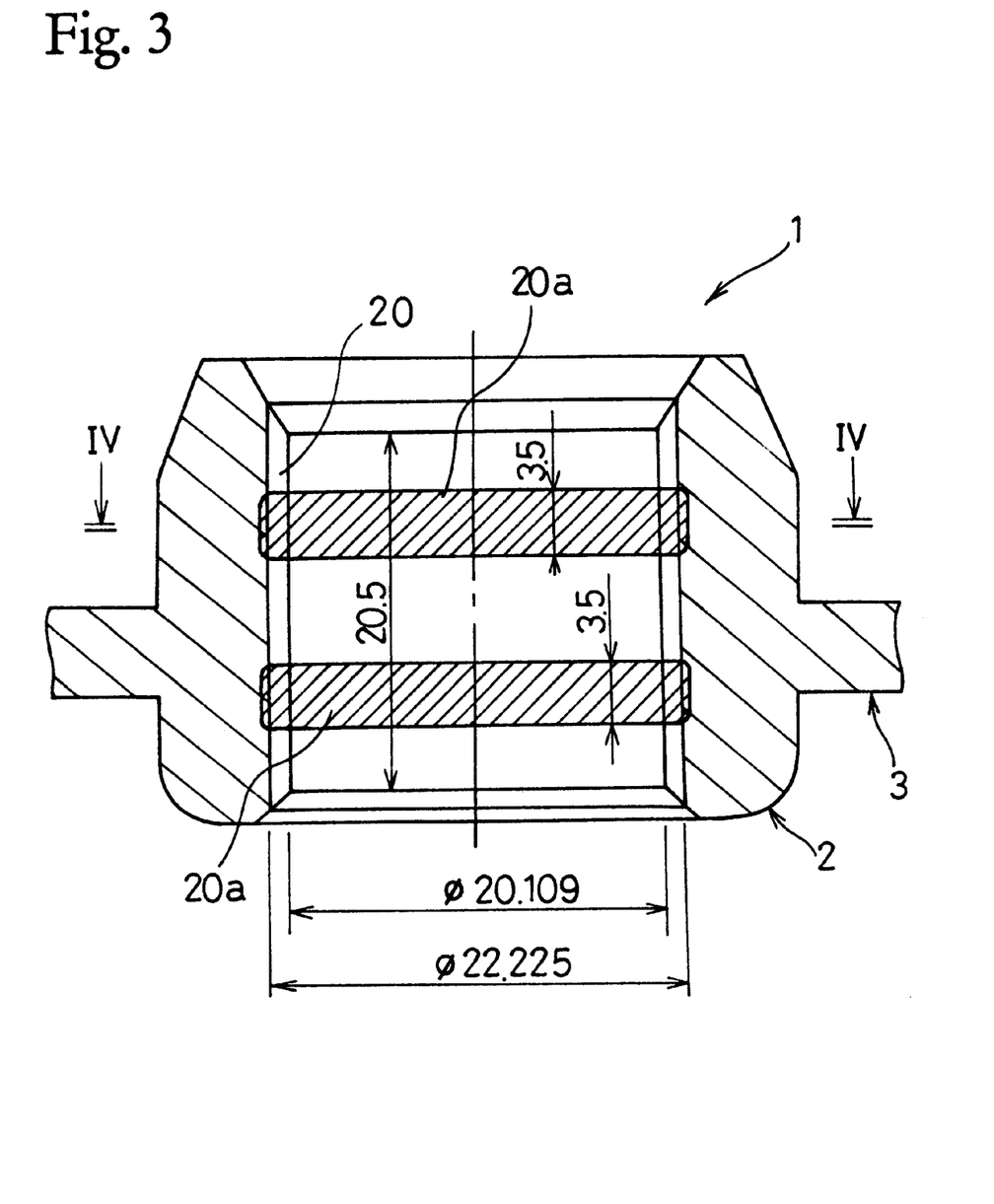
FIG. 3 is a longitudinal cross-sectional view of a spline hub of the clutch disk assembly.
Figure 4:
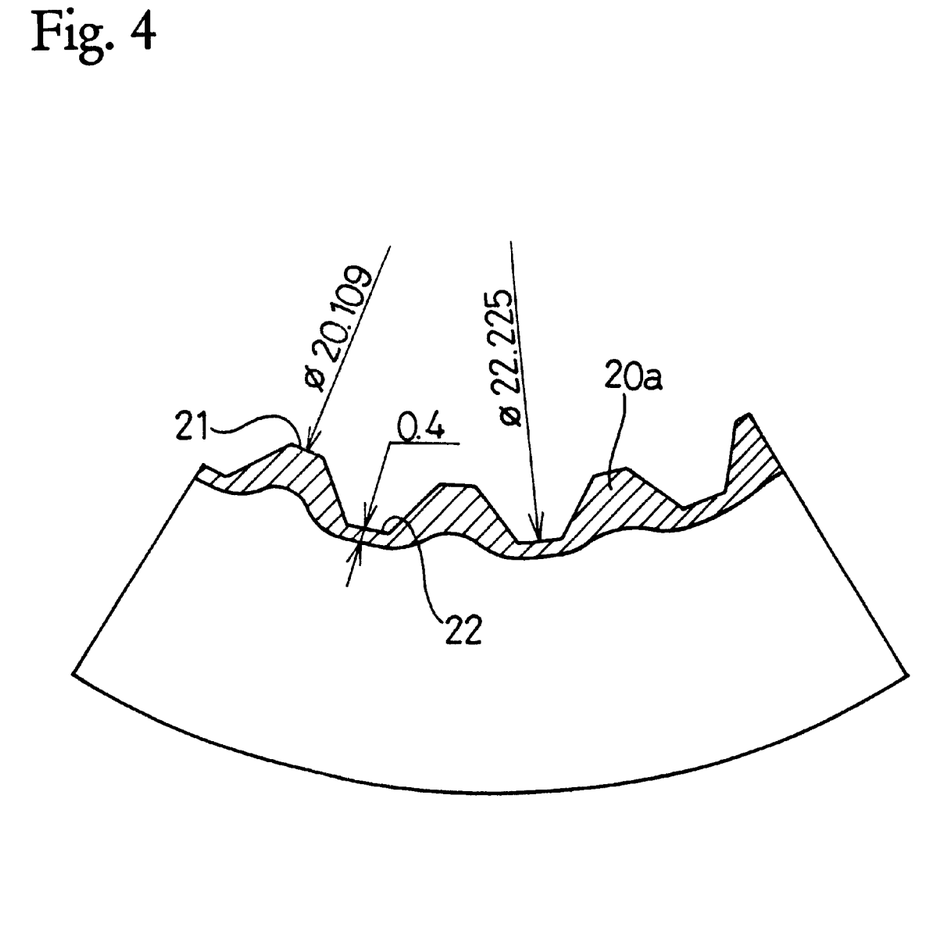
FIG. 4 is a cross-sectional view of the spline hub as seen along line IV—IV in the FIG. 3.

The following is an explanation of high-frequency hardening, which is applied to the spline grooves 20 of the spline hub 1. As shown in FIG. 3 and FIG. 4, the spline grooves 20 are partially hardened to form a pair of partially hardened layers 20a. The hardened layers 20a are the cross-hatched areas in the FIGS. 3 and 4. The hardened layers 20a are formed in two locations that are separated in the axial direction. The hardened layers 20a are preferably continuous in the circumferential direction so as to cross each of the spline grooves 20. In this embodiment, the width of each of the hardened layers 20a is approximately 3.5 mm. The axial length of the spline grooves 20 of the spline hub 1 is approximately 20.5 mm. In other words, the hardened layers 20a are formed on approximately 35% of the surfaces of the spline grooves 20. Since the ratio of the hardened layers 20a to the total area of the surfaces of the spline grooves 20 is approximately 35%, it meets the minimum requirement of approximately 10% and the upper limit of approximately 50. This ensures the resistance to wear and the accuracy of the dimension. This 35% is also greater than 20%, which is a criterion for the resistance to wear with a margin for security taken into account. This 35% is also smaller than 40%, which is a criterion for the accuracy of the dimension with a margin of security taken into account. Therefore, the spline hub 1 in this embodiment is well balanced in terms of the resistance to wear and the accuracy of the dimension.

The spline hub 1 as described herein is preferably made of carbon steel, which contains approximately 0.48% of carbon. Preferably, the spline grooves 20 of spline hub 1 form a diameter of the top or addendum (referred to as smaller diameter hereinafter) of approximately 20.109 mm and a diameter of the bottom (referred to as larger diameter hereinafter) of approximately 22.225 mm. The frequency of the high-frequency hardening is preferably 400 kHz. The depth of the hardened layer at the bottom 22 of the spline grooves 20 is 0.4 mm (=400 µm). If the depth of the hardened layer at the bottom 22 of the spline grooves 22 is greater than 600 µm, the smaller diameter and the larger diameter of the spline hub 1 will make a dimensional change. Therefore the accuracy of the dimension of the spline hub 1 will not be maintained. By setting the frequency at 400 kHz, the depth of the hardened layer is kept below 600 µm.

Figure 5:
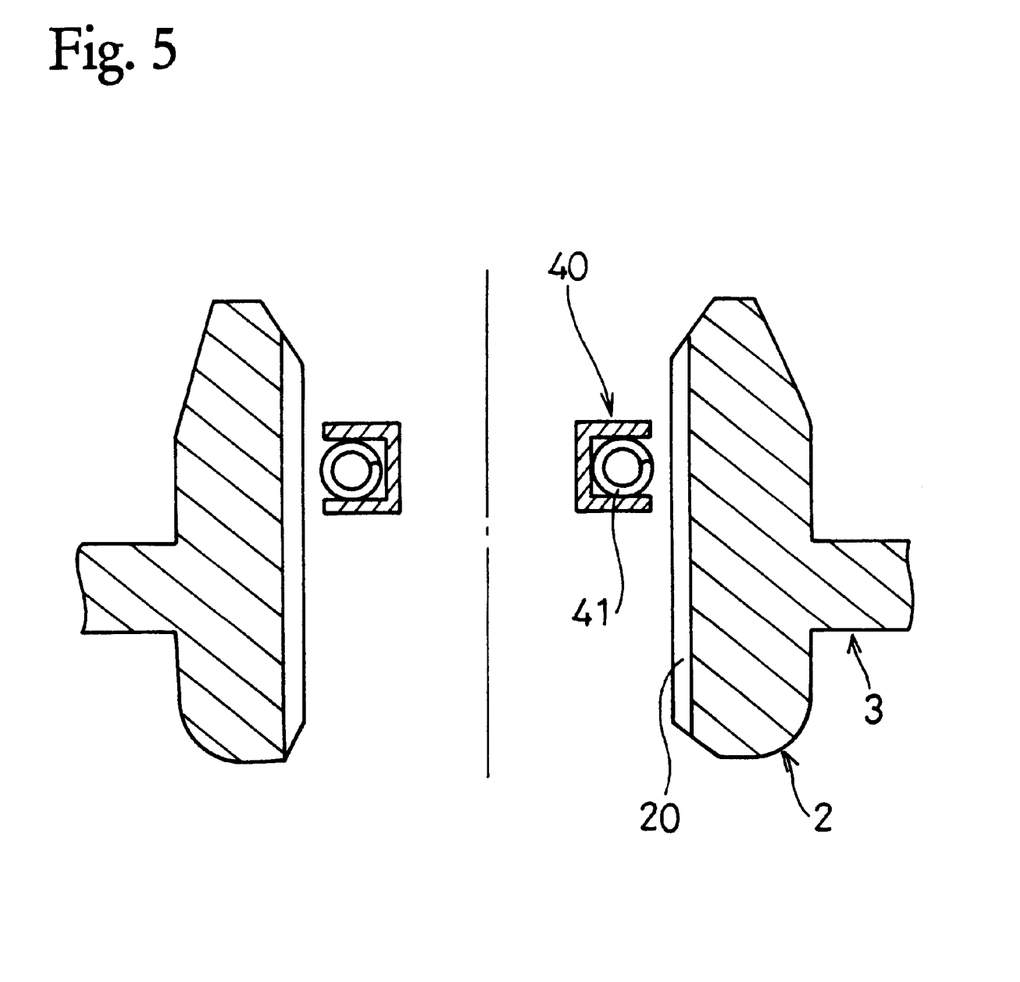
FIG. 5 is a state diagram of a high-frequency hardening.

In the high-frequency hardening, the surface of the spline grooves 20 are heated internally with a high-frequency heating device 40, which is smaller than the smaller diameter of the spline hub 1 as shown in FIG. 5. After the surface forming the spline grooves 20 is heated, the surface forming the spline grooves 20 is quenched by spraying coolant. As shown in the FIG. 5, the high-frequency heating device 40 is used to only partially heat the surface of the spline grooves 20. In particular, the high-frequency heating device 40 has a small with in the axial direction so that thin ring-shaped hardened layers 20a can be formed. This way, there is almost no deformation from hardening where the hardened layer 20a is not formed. At the time of hardening, the high-frequency heating device 40 and a coil 41, which is a main component of the high-frequency heating device 40 and supplies a high-frequency voltage, are kept at a predetermined position while the spline hub 1 rotates. In this way, the hardened layers 20a will be formed uniformly in the circumferential direction.

The following table reports the results of a comparison of variations of the measurement between the spline grooves 20 which partially include the hardened layers 20a as shown in the FIGS. 3 and 4 and conventional spline grooves which have the hardened layer on the whole surfaces (not shown).

TABLE 1

| | Depth of the Hardened Layer at the Bottom of the Spline Teeth | Variation of Large Diameter | Variation of Small Diameter |
|---|---|---|---|
| Spline Hub with Hardened Layer Partially Formed on the Spline Grooves | About 0.4 mm | 0.01 mm~0.02 mm | 0.01 mm~0.02 mm |
| Spline Hub with Hardened Layer Formed on the Entire Surface of the Spline Grooves | About 0.4 mm | 0.06 mm~0.08 mm | 0.06 mm~0.08 mm |

The spline hubs used in the above test had spline grooves 20 with a smaller diameter of about 20.109 mm and the larger diameter of about 22.225 mm prior to the hardening. Also, the spline hubs of the above tests had an overpin diameter of about 18.60 mm with about 1.80 mm diameter pin located in opposite grooves of the splines. According to the Table 1, in the case of the spline hub which includes the hardened layer 20a only partially along its surface, the variation of the dimension after the hardening is small enough that the accuracy of the dimension after the hardening is within the allowable range. In the case of the spline hub which has the hardened layer on the whole surface, however, the deformation from the hardening is so great that the accuracy of the dimension of the spline hub is out of the allowable range. Therefore, when the whole surface of the spline grooves 20 are hardened, an additional process, such as polishing, is needed to ensure the accuracy of the dimension.

The following table reports the results of a durability test which compares the resistance to wear between a spline hub whose surface of the spline grooves is plated and the spline hub 1 of this embodiment.

TABLE 2

Amount of Wear in The Diameter of a Spline Overpin Due to Abrasion in a Durability Test (mm)

|  | Spline Hub with the Surface of the Spline Grooves Plated | Spline Hub with the Surface of the Spline Grooves Partially Hardened By High-Frequency Hardening |
|---|---|---|
| Average Diameter Before Durability Test (mm) | 18.608 | 18.568 |
| Average Diameter After Durability Test (mm) | 18.618 | 18.573 |
| Variation | +0.010 | +0.005 |

In the above durability test, the clutch is engaged and disengaged 5 million times at predetermined speed and torque and at room temperature. The spline hubs used in the above test had spline grooves 20 with a smaller diameter of about 20.109 mm and the larger diameter of about 22.225 mm prior to the hardening. Also, the spline hubs of the above tests had an overpin diameter of about 18.60 mm with about 1.80 mm diameter pin located in opposite grooves of the splines. As can be seen from the Table 2, the amount of wear in terms of the variation of the diameter of spline overpin is almost the same for both of the spline hubs. Therefore, the resistance to wear of the spline hub 1 that is partially hardened according to the embodiment of the present invention almost matches the resistance to wear of a plated spline hub.

Another Embodiment

Figure 6:
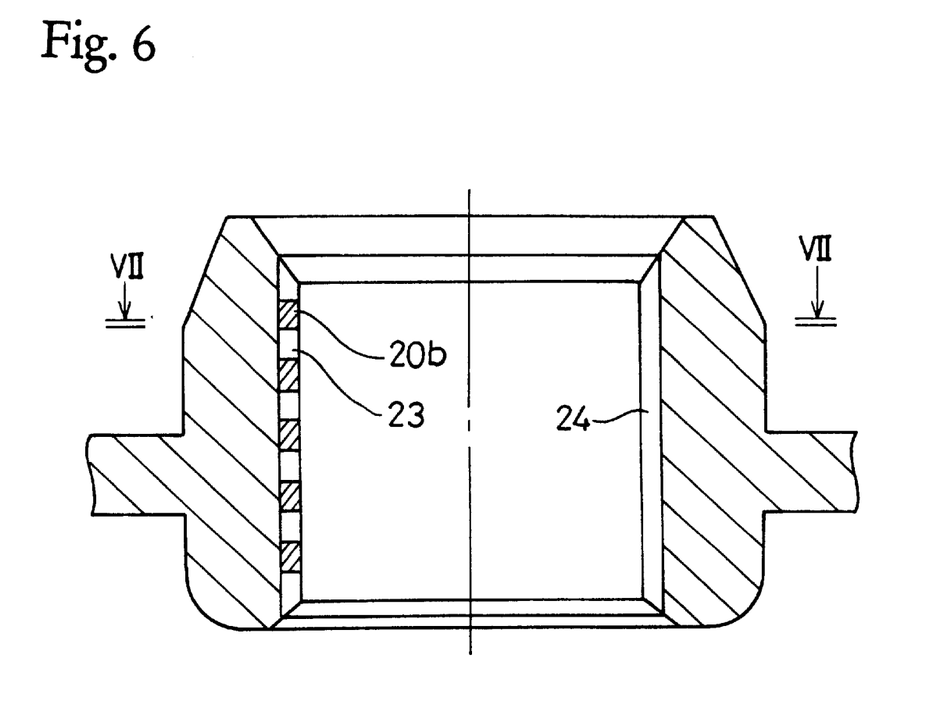
FIG. 6 is a longitudinal cross-sectional view of a spline hub of the clutch disk assembly in accordance with another embodiment.
Figure 7:
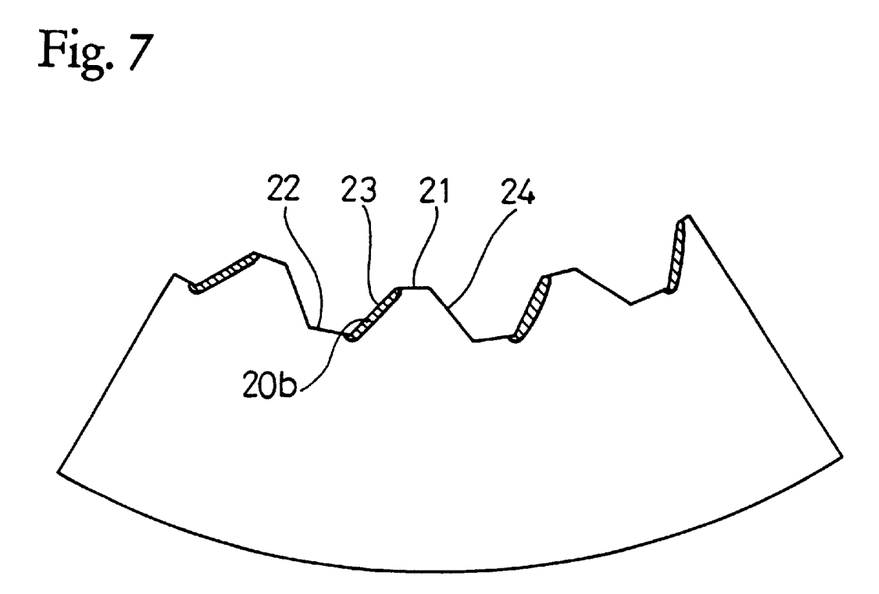
FIG. 7 is a cross-sectional view of the spline hub as seen along line VII—VII in the FIG. 6.
Figure 8:
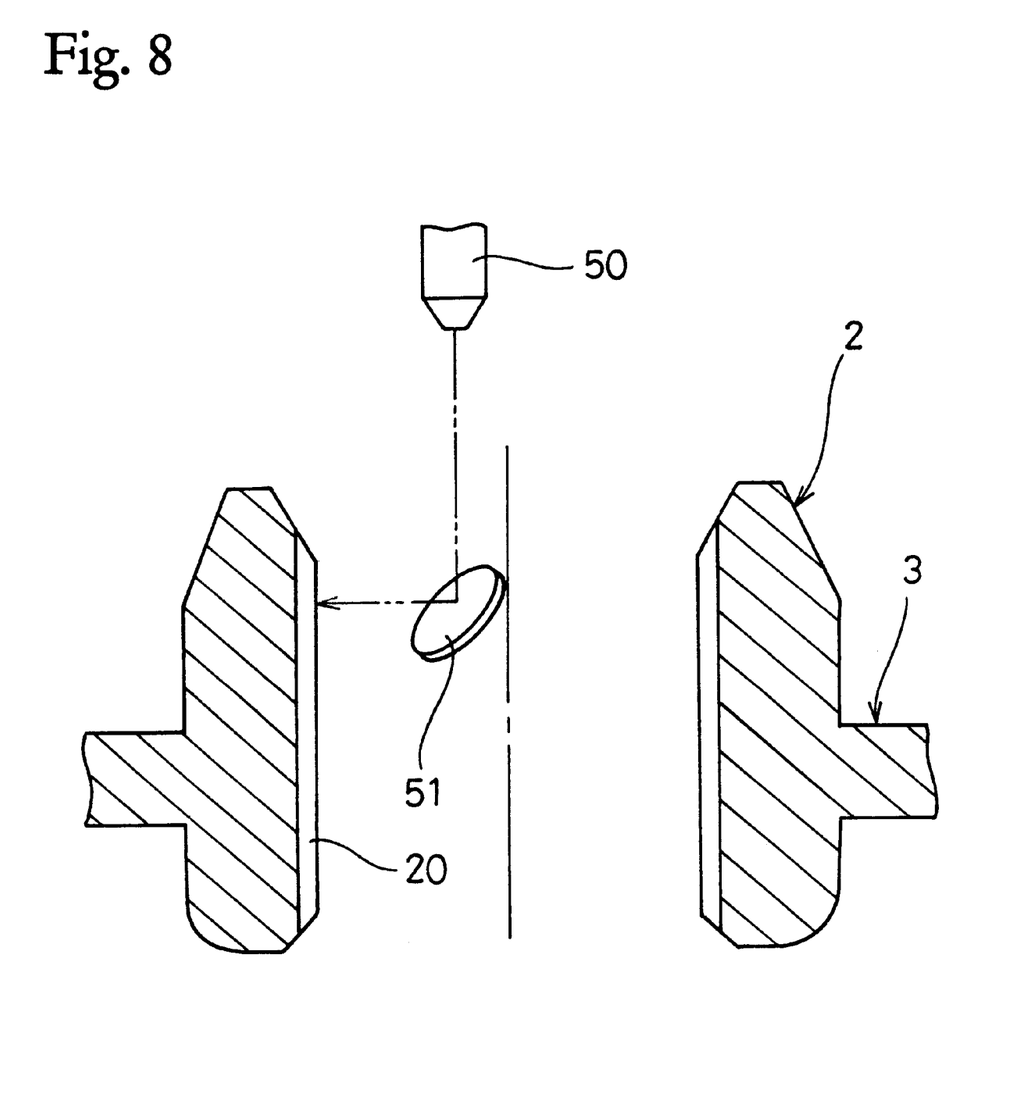
FIG. 8 is a diagrammatic view of a laser hardening device projecting a laser beam of light onto a selected surface of one of the spline grooves.

Referring now to FIGS. 6–8, a modified spline hub 1 is illustrated in accordance with the present invention. In view of the similarities between this embodiment and the prior embodiment, the same reference numerals will be used for indicating parts and portions which are the same as or similar to the first embodiment. Thus, these parts or portions will not be discussed or illustrated in detail with reference to this embodiment. Rather, it will be apparent to those skilled in the art from this disclosure that the description of these parts or portions as referred to in the description of the first embodiment also apply to this embodiment.

The first embodiment described above forms the hardened layers 20a on the spline grooves 20 by high-frequency hardening. It is also possible to form a hardened layer by laser hardening instead of high-frequency hardening.

In this case, a laser oscillation device 50 and a reflector 51 are used to partially harden the spline grooves 20 as shown in FIG. 8. Laser light or beam from the laser oscillation device 50 changes the direction at the reflector 51 toward the spline grooves 20. When the laser light hits the selected surface of the spline grooves 20, the temperature of the selected surface increases, and the surrounding areas are also heated from heat conduction. These areas are self-quenched and become hardened. In this laser hardening, the power level of the laser and duration of the irradiation are determined such that the depth of the hardened layer at the bottom of the spline grooves 20 is greater than 3 μm.

As is shown in FIGS. 6 and 7, it is mainly the first sides 23 of the spline grooves 20 that are laser-hardened out of all the surfaces of the spline grooves 20. The first side 23 is one of the sides between the top or addendum 21 and the bottom 22 of the spline groove 20 and transmits positive rotational torque. Normally, the first side 23, which transmits positive rotational torque, is exposed to incessant contacts due to fluctuation of torque. Therefore, the first sides are the side of the grooves 20 that wear the most out of all the surfaces of the spline grooves 20. By forming the hardened layer 20b intensively on the first side 23, the resistance to wear can be improved most with minimal area of hardening. In the case of high-frequency hardening, the top 21, the bottom 22 and the second side 24 (the side that transmits negative rotational torque) as well as the first side 23 of each of the spline grooves 20 have to be heated up, resulting in greater variation of the dimension due to deformation from heat. Laser hardening, on the other hand, can choose the spot to form hardened layers. This way, hardened layers 20b are formed mainly on the first sides 23 of each of the spline grooves 20.

Effect of the Invention

This invention forms hardened layers on the surface of the spline groove only to the extent that the necessary resistance to wear is secured. This way, the resistance to wear is ensured and the accuracy of the dimension of the spline hub after the hardened layer is formed is ensured at the same time.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spline hub adapted to be attached to a damper disk assembly being operable to transmit torque between an input rotational body and an output rotational body, said spline hub comprising:

a flange portion configured to be coupled to an input side member of the damper disk assembly, with the input rotational body inputting torque to the input side member, said flange portion having an inner peripheral end and an outer peripheral end; and a boss portion fixedly coupled to said inner peripheral end of said flange portion, said boss portion having a bore with an inner peripheral surface forming a plurality of spline grooves, said spline grooves defining teeth having a bottom portion, an addendum portion and first and second sides located between said bottom portion and said addendum portion, said spline grooves being adapted to be spline-engaged with the output rotational body, and said spline grooves having a hardened layer formed on only part of said inner peripheral surface.

2. The spline hub according to claim 1, wherein said inner peripheral surface forming said spline grooves includes said hardened layer on at least two locations that are axially separated from each other.

3. The spline hub according to claim 1, wherein said hardened layer is formed on ten percent to fifty percent of the area of said inner peripheral surface forming said spline grooves.

4. The spline hub according to claim 2, wherein said hardened layer is formed on ten to fifty percent of the area of said inner peripheral surface forming said spline grooves.

5. The spline hub according to claim 1, wherein said hardened layer is formed by high-frequency hardening.

6. The spline hub according to claims 2, wherein said hardened layer is formed by high-frequency hardening.

7. The spline hub according to claim 3, wherein said hardened layer is formed by high-frequency hardening.

8. The spline hub according to claim 1, wherein said hardened layer is continuous in circumferential direction.

9. The spline hub according to claim 2, wherein said hardened layer is continuous in circumferential direction.

10. The spline hub according to claim 3, wherein said hardened layer is continuous in circumferential direction.

11. The spline hub according to claim 5, wherein a frequency of said high-frequency hardening is greater than 400 kHz, the depth of the hardened layer at said bottom portion of said spline groove is less than 600 µm, and said spline hub is made of either alloy steel or carbon steel which contains carbon more than 0.35%.

12. The spline hub according to claim 6, wherein a frequency of said high-frequency hardening is greater than 400 kHz, the depth of the hardened layer at said bottom portion of said spline groove is less than 600 µm, and said spline hub is made of either alloy steel or carbon steel which contains carbon more than 0.35%.

13. The spline hub according to claim 7, wherein a frequency of said high-frequency hardening is greater than 400 kHz, the depth of the hardened layer at said bottom portion of said spline groove is less than 600 µm, and said spline hub is made of either alloy steel or carbon steel which contains carbon more than 0.35%.

14. The spline hub according to claim 11, wherein the difference between the radiuses of said addendum portion and said bottom portion of said spline hub after said hardened layer is formed and the diameter radiuses of said addendum portion and said bottom portion of said spline hub before hardening is not more than 0.2%.

15. The spline hub according to claim 12, wherein the difference between the radiuses of said addendum portion and said bottom portion of said spline hub after said hardened layer is formed and the radiuses of said addendum portion and said bottom portion of said spline hub before hardening is not more than 0.2%.

16. The spline hub according to claim 13, wherein the difference between the radiuses of said addendum portion and the bottom portion of said spline hub after said hardened layer is formed and the radiuses of said addendum portion and said bottom portion of said spline hub before hardening is not more than 0.2%.

17. The spline hub according to claim 1, wherein said hardened layer is formed by laser hardening.

18. The spline hub according to claim 2, wherein said hardened layer is formed by laser hardening.

19. The spline hub according to claim 3, wherein said hardened layer is formed by laser hardening.

20. The spline hub according to claim 17, wherein the depth of said hardened layer at said bottom portion of said spline hub is greater than 3 µm.

21. The spline hub according to claim 18, wherein the depth of said hardened layer at said bottom portion of said spline hub is greater than 3 µm.

22. The spline hub according to claim 19, wherein the depth of said hardened layer at said bottom portion of said spline hub is greater than 3 µm.

23. The spline hub according to claim 20, wherein said hardened layer is formed on said first side of said teeth, said first side being located between said bottom portion and said addendum portion for transmitting positive rotational torque.

24. The spline hub according to claim 21, wherein said hardened layer is formed on said first side of said teeth, said first side being located between said bottom portion, and said addendum portion for transmitting positive rotational torque.

25. The spline hub according to claim 22, wherein said hardened layer is formed on said first side of said teeth, said first side being located between said bottom portion and said addendum portion for transmitting positive rotational torque.

* * * * *